United States Patent [19]

Spence et al.

[11] Patent Number: 5,552,493
[45] Date of Patent: Sep. 3, 1996

[54] METHOD FOR PRODUCING ASYMMETRIC RADIAL POLYMERS

[75] Inventors: Bridget A. Spence; Ronald J. Hoxmeier; Glenn R. Himes, all of Houston, Tex.

[73] Assignee: Shell Oil Company, Houston, Tex.

[21] Appl. No.: 453,039

[22] Filed: May 30, 1995

[51] Int. Cl.$^6$ .......................... C08F 297/04; C08G 81/02
[52] U.S. Cl. .......................... 525/314; 525/316; 525/105; 525/338
[58] Field of Search .................... 525/314, 316, 525/105, 338

[56] References Cited

U.S. PATENT DOCUMENTS

| | | | |
|---|---|---|---|
| 4,137,391 | 1/1979 | Smith et al. | 526/178 |
| 4,185,042 | 1/1980 | Verkouw | 525/332 |
| 5,075,377 | 12/1991 | Kawabuchi et al. | 525/89 |
| 5,393,841 | 2/1995 | Himes | 525/314 |

FOREIGN PATENT DOCUMENTS

| | | |
|---|---|---|
| 0314256 | 10/1988 | European Pat. Off. . |
| 0464847 | 7/1991 | European Pat. Off. . |

*Primary Examiner*—Irina Zemel
*Attorney, Agent, or Firm*—Donald F. Haas

[57] ABSTRACT

The present invention is a process for producing predominately four-armed asymmetric radial block copolymers which contain predominately, on average, two arms which are copolymers of at least one conjugated diene and at least one vinyl aromatic hydrocarbon and two conjugated diene homopolymer or copolymer arms, said process comprising:

(a) anionically polymerizing at least one conjugated diene monomer and at least one vinylaromatic hydrocarbon monomer to form a set of living polymer arms, (b) anionically polymerizing at least one conjugated diene monomer to form another set of living polymer arms, (c) coupling the one set of living polymer arms with a coupling agent which is selected from the group consisting of tetramethoxysilane and γ-glycidoxypropyltrimethoxysilane, (d) substantially completing the coupling reaction while leaving, on average, two unreacted coupling sites on the coupling agent, (e) adding the other set of living polymer arms to the product of d) and coupling the other set of living polymer arms to the first coupled set of polymer arms, and (f) optionally, hydrogenating the coupled polymer, either partially or fully.

14 Claims, No Drawings

METHOD FOR PRODUCING ASYMMETRIC RADIAL POLYMERS

BACKGROUND OF THE INVENTION

The present invention relates to a method for producing asymmetric radial polymers. More particularly, this invention relates to a method for producing asymmetric radial polymers which have, on average, two arms which are composed of a first polymer type and two arms which are composed of a second polymer type.

Heretofore, several methods have been proposed for preparing asymmetric radial polymers. As is well known in the prior art, radial polymers comprise three or more arms extending outwardly from a nucleus. The asymmetric radial polymers contain arms of at least two different polymers, which polymers may vary as to chemical composition, structure, and/or molecular weight. A principal difference in the methods frequently used to prepare asymmetric radial polymers resides in the selection of a coupling agent which forms the nucleus of the radial polymer. Multifunctional coupling agents such as silicon tetrachloride have been used to form asymmetric radial polymers having three or four arms. Star-shaped radial polymers having many more arms have been formed using a poly alkenyl aromatic compound, such as divinyl benzene, as the coupling agent as described in Canadian Patent 716,645.

Before 1988, such asymmetric radial polymers were made by forming a blend of the different polymeric arms in the desired ratio and then adding the coupling agent to couple the arms to the coupling agent. Those methods resulted in a product having, on average, the desired number of each kind of arm in the asymmetric polymer. The problem associated with producing asymmetric polymers in that manner is that the product obtained is actually a statistical distribution of all possible products, ranging from that having all polymer arms of a first polymer type to that having all polymer arms of a second polymer type.

U.S. Pat. No. 5,212,249 discloses a two-reactor process for producing asymmetric radial polymers which increases the amount of polymer produced having the desired composition of arms. The process involves separately polymerizing the monomers to create separately the two different types of arms (it was not thought possible to polymerize the arms in the same reactor and still achieve a product which is not a statistical blend). Then one of the polymeric arms is coupled to the coupling agent and when that coupling reaction is complete, the second set of polymer arms is coupled to the coupling agent. This maximizes production of the desired species of asymmetric radial block copolymer.

The two-reactor process described above is very advantageous and produces polymers which have very good properties and are useful in adhesive compositions and for a wide variety of other uses. However, when a four-arm asymmetric radial polymer containing two different arm types in a 1:1 ratio is desired, the two-reactor process does have the disadvantage that it still produces polymers which are a blend of structures. While the polymer will have, on average, two polymer arms of each type the actual product will be a blend of asymmetric radial polymers containing three polymer arms of the first type and one polymer arm of the second type, two polymer arms of each type, and one polymer arm of the first type and three polymer arms of the second type. These polymeric components will behave differently in their strength and flow properties and therefore the properties of the final product will differ according to the amount of each polymer component present. For example, a component containing three polystyrene-polydiene copolymer arms and one homopolydiene arm will be of much higher viscosity than the desired component with two polystyrene-polydiene copolymer arms and two homopolydiene arms. A component containing three homopolydiene arms and one polystyrene-polydiene arm will be of much lower strength than the desired component with two polystyrene-polydiene copolymer arms and two homopolydiene arms. Further, the most commonly used radial polymer coupling agent, silicon tetrachloride, is unfavorable towards polydiene hydrogenation for certain hydrogenation catalyst systems. For instance, high levels of chloride ion (produced when a living polymer chain displaces a chloride of silicon tetrachloride) have deleterious effects on certain hydrogenation catalysts, and hydrogenation catalysts which must be extracted with aqueous acid which produces a labile chloride ion during catalyst removal which promotes stress corrosion cracking in most metal vessels.

Therefore, it would be very advantageous to have a method which is capable of maximizing the amount of the desired four armed polymer with two copolymer arms and two homopolymer arms which is produced and which does not require the use of silicon tetrachloride as the coupling agent. It would be even more advantageous to have a coupling agent which gives a higher yield of the desired species than silicon tetrachloride does. The present invention provides such a process and produces such a polymer.

SUMMARY OF THE INVENTION

The present invention is a process for producing a predominately four armed asymmetric radial block copolymer which contains predominately two arms which are copolymers of a conjugated diene and a vinyl aromatic hydrocarbon and two conjugated diene homopolymer or copolymer arms, said process comprising:

(a) anionically polymerizing at least one conjugated diene monomer and at least one vinylaromatic hydrocarbon monomer to form a set of living polymer arms, (b) anionically polymerizing at least one conjugated diene monomer to form another set of living polymer arms, (c) coupling the one set of living polymer arms with a coupling agent which is selected from the group consisting of tetramethoxysilane and γ-glycidoxypropyltrimethoxysilane, (d) substantially completing the coupling reaction while leaving, on average, two unreacted coupling sites on the coupling agent, (e) adding the other set of living polymer arms and coupling the other set of living polymer arms to the first coupled set of polymer arms, and (f) optionally hydrogenating the coupled polymer either partially to obtain an asymmetric radial polymer with diene and hydrogenated diene arms or fully to obtain an asymmetric radial polymer with hydrogenated diene arms.

In the preferred embodiment, one set of polymer arms is formed by polymerizing a conjugated diene, preferably isoprene, and the other set of living polymer arms is formed by polymerizing a vinyl aromatic hydrocarbon block, preferably styrene, and then polymerizing a conjugated diene block, preferably an isoprene or butadiene block. The preferred coupling agent is tetramethoxysilane.

DESCRIPTION OF THE INVENTION

The method of this invention is particularly suitable for the preparation of asymmetric radial polymers from socalled "living" polymers containing a single terminal metal ion. As is well known in the prior art, "living" polymers are polymers containing at least one active group such as a metal atom bonded directly to a carbon atom. "Living" polymers are readily prepared via anionic polymerization.

In general, the polymers produced by the processes taught herein may be polymers of one or more conjugated dienes containing from 4 to 12 carbon atoms such as 1,3-butadiene, isoprene, piperylene, methyl pentadiene, phenyl butadiene, 3,4-dimethyl-1,3-hexadiene, 4,5-diethyl-1,3-octadiene and the like, preferably those conjugated diolefins containing from 4 to 8 carbon atoms. The polymers produced by these processes may also be copolymers of one or more of the above conjugated diolefins and one or more other monomers, particularly vinyl aromatic hydrocarbon monomers such as styrene, various alkyl substituted styrenes, alkoxy substituted styrenes, vinyl naphthalene and the like. Homopolymers and copolymers of monoalkenyl aromatic hydrocarbons may also be useful as polymer arms in the present invention.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric radial polymer of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

$$RLi$$

wherein R is an aliphatic, cycloaliphatic, alkyl-substituted cycloaliphatic, aromatic or alkyl-substituted aromatic hydrocarbon radical having from 1 to 20 carbon atoms.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

In this invention, one set of polymer arms is made by polymerizing at least one conjugated diene monomer to form a living polymer arm which is then coupled. This first coupling reaction is then allowed to proceed to completion, leaving, predominately, two unreacted coupling sites on each coupling agent molecule. Next, at least one conjugated diene monomer and at least one vinyl aromatic hydrocarbon monomer are polymerized to form a second set of living polymer arms. Finally, the second set of living polymer arms is coupled to the partially coupled intermediate in the presence of a polar activator to form the desired asymmetric radial block copolymer. Alternatively, the vinyl aromatic conjugated diene arms may be reacted with the coupling agent first and the conjugated diene arms second. The copolymer formed is predominantly comprised of the species which has four arms, two of which are diene/vinylaromatic hydrocarbon copolymer arms and two of which are diene homo- or copolymer arms. By "predominantly" herein is meant that the copolymer is made up of more than 50% by weight of the species described in the preceding sentence. More importantly, no species having all four arms alike is formed.

It is preferred that two arms are block copolymers of polystyrene-polydiene (such as polystyrene-polybutadiene or polystyrene-polyisoprene or polystyrene-polybutadiene-polyisoprene where the polydienes are polymerized randomly or in blocks) where the polydiene is unsaturated or either partially or fully hydrogenated. It is preferred that two arms are polydiene (such as polybutadiene or polyisoprene or block or random copolymers of polybutadiene-polyisoprene) unsaturated or either partially or fully hydrogenated. If the polydiene is polyisoprene then it is best to add a small polybutadiene block since it is then easier to obtain a high percentage of four arm polymer in the final coupling step.

After the first coupling reaction is completed, it is important that, on average, two coupling sites on the coupling agent are left unreacted and available for further reaction with the second set of living polymer arms. The predominant intermediate species must have two unreacted coupling sites. "Predominant" herein carries the same meaning as above. The second set of living polymer arms is coupled to the coupled first set of polymer arms through the unreacted coupling sites on the coupling agent.

The silicon-based coupling agent of the present invention is selected from the group consisting of tetramethoxysilane $(Si(OMe)_4)$ and γ-glycidoxypropyltrimethoxysilane. Both of these coupling agents produce more of the desired polymer species than does silicon tetrachloride, and can provide fully or partially hydrogenated polymers without production of corrosive labile chloride ion. Tetramethoxysilane is preferred because it typically produces a higher level of four arm polymer in the final coupling step, at least 75% by weight.

In general, any polar compound known to be suitable for increasing the vinyl content in diolefin polymers will be suitable for use as a coupling activator in the second coupling step of the process of this invention. Suitable polar compounds include the Lewis bases. Suitable polar compounds, then, include ethers, such as diethyl ether, dibutyl ether, tetrahydrofuran, ethylene glycol dimethyl ether, ethylene glycol dibutyl ether, ethylene glycol dimethyl ether, diethylene glycol dibutyl ether, dioxane, triethylene glycol ether, 1,2-dimethoxy benzene, 1,2,3-trimethoxy benzene, 1,2,4-trimethoxy benzene, 1,2,3-triethoxy benzene, 1,2,3-tributoxy benzene, 1,2,4-triethoxy benzene and the like. Suitable polar compounds also include tertiary amines such as triethyl amine, tributyl amine, N,N,N',N'-tetramethyl ethylene diamine and the like. Suitable polar compounds include various pyridine and pyrolidene compounds such as dipipyridinoethane, dipyrolidinoethane and the like. In general, the coupling activator will be used at a concentration within the range from 10 to 1000 ppm. The preferred coupling activators are ethylene glycol diethyl ether, onhodimethoxybenzene, N,N,N',N '-tetramethylethylenediamine, diethylether, and the like, with ethylene glycol diethyl ether being most preferred.

As a general pale, the polymerization of the set of living polymer arms which contain a diene and a vinylaromatic hydrocarbon or a diene may be carried out at −150 to 300° C. preferably 0° to 100° C. until the monomer is consumed, usually within 15 to 120 minutes, preferably 30 to 60 minutes. In general, the conditions of the coupling reactions are 20° to 100° C., preferably 50° to 80° C., and 5 to 100 minutes, preferably 15 to 60 minutes.

The asymmetric radial block copolymers of the present invention may have molecular weights varying over a wide range. In general, the molecular weights of these block copolymer arms will range from about 10,000 up to as much as 250,000, and the molecular weights of the polydiene arms will range from 1000 to 100,000 g/mole. The preferred block copolymer arms of the present invention fall within the molecular weight range of 15,000 to 100,000, and the polydiene arms within 5000 to 50,000 g/mole.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

1. *Modem Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

These polymers may be hydrogenated after they are coupled. They may be partially hydrogenated such that one portion of the polymer is hydrogenated and another is not. For example, styrene-butadiene arms could be made as well as isoprene arms. It is possible to selectively hydrogenate the butadiene in the styrene-butadiene arms and not significantly hydrogenate the isoprene arms. This is the preferred embodiment of the present invention. The hydrogenation can take place in a selective manner with a suitable catalyst and conditions like those described in Reissue 27,145, U.S. Pat. No. 4,001,199 or with a titanium catalyst such as disclosed in U.S. Pat. No. 5,039,755, all of which are incorporated herein by reference.

The asymmetric radial polymers of this invention may be used in any of the applications for which asymmetric radial polymers having the same relative arm structure can be used. Suitable end use applications, then, include impact modification of engineering thermoplastics, impact modification of unsaturated thermosetting polyesters, molded goods, adhesives, tie layers, asphalt modification, and the like.

The following is a typical synthesis summary for preparation of a four arm asymmetric radial polymer in which the predominant species has a 2:2 arm ratio, i.e., two arms of one kind and two arms of the other kind. Polymers are prepared by first adding about 2 equivalents of the first set of polymer arms to a tetrafunctional coupling agent forming a partially coupled intermediate which has, on average, two polymer arms and two unreacted coupling sites. In the case of silicon tetrachloride, γ-glycidoxypropyltrimethoxysilane, and tetramethoxysilane, this partially coupled intermediate is composed of a mixture of three components containing one, two, and three polymer arms. In the second coupling step, two or more equivalents of a second type of polymer arm are added to the partially coupled intermediate in the presence of a polar activator (ethers like o-dimethoxybenzene, 1,2-diethoxyethane, or 1,2-dimethoxyethane). Since the coupling sites are very reactive towards living polymer arms, no unreacted coupling agent is present after the first coupling step as evidenced by the lack of symmetric radial polymer containing four arms of the second polymer arm type in the final product mixture. In addition, since the last site of the coupling agent is much less reactive in the absence of a polar activator, no four arm symmetric polymer is produced in the first coupling step.

If the molecular weights of the components of the four-arm asymmetric radial polymer final product are similar, the distribution cannot be analytically determined by Gel Permeation Chromatography. In these cases, the final product distribution can be calculated from the partially coupled intermediate distribution, which is more easily determined.

For example, in a four-arm asymmetric radial polymer containing styrene-butadiene diblock copolymer arms and polyisoprene arms, the components of the partially coupled intermediate are represented as $I_x$ and those of the final product as $SB_{(4-x)}I_x$ where x equals the number of polyisoprene arms. For the synthesis of four-arm asymmetric radial polymers with a 2:2 arm ratio using silicon tetrachloride, γ-glycidoxypropyltrimethoxysilane, or tetramethoxysilane coupling agents, x may be equal to 1, 2, or 3. In the following equations, the molecular weight of the polymer arms are denoted as MW I and MW SB.

Analysis of the partially coupled intermediate by Gel Permeation Chromatography (GPC) allows for separation of the three individual components by their molecular weights. Detection of the intermediates using a Refractive Index (R.I.) detector quantifies the amount of each component in the mixture. The areas of each peak, as detected by Refractive Index, are proportional to the number of repeat units which elute. When each repeat unit has the same mass, the % of total area for a peak as measured by R.I. will be equal to the % weight of that component.

In this manner, the weight fraction of each component in the partially coupled intermediate is determined by GPC. The mole fraction of each intermediate is given by:

$$\text{Mole Fraction of } I_x = \frac{\text{Moles of } I_x}{\text{Total Moles}} \quad (1)$$

where:

$$\text{Moles of } I_x = \frac{\text{Mass of } I_x}{MW \text{ of } I_x} = \frac{\text{Wt. Fraction of } I_x}{MW \text{ of } I_x} \quad (2)$$

for a total of 1 gram of partially coupled intermediate. The molecular weight of each component will be:

$$MW \text{ of } I_x = MW\ I \cdot x$$

since the coupling agent residue, e.g., $SiCl_{(4-x)}$ or $Si(OMe)_{4-x}$, doesn't contribute significantly to the molecular weight. The Total Moles will be equal to the sum over all intermediates—$I_3$, $I_2$, and $I_1$.

$$\text{Total moles} = \sum_{x=1,2,3} \frac{\text{Wt. Fraction of } I_x}{MW\ I \cdot x} \quad (3)$$

which gives the following expression for the mole fraction of each partially coupled intermediate:

$$\text{Mole Fraction of } I_x = \frac{\left(\dfrac{\text{Wt. Fraction of } I_x}{MW\ I \cdot x}\right)}{\left(\sum\limits_{x=1,2,3} \dfrac{\text{Wt. Fraction of } I_x}{MW\ I \cdot x}\right)} \quad (4)$$

Due to the nature of the synthesis, when the final product composition is formed, the mole fraction of each final product component will be equal to the mole fraction of the intermediate component from which it was formed.

$$\text{Mole Fraction } (SB)_{(4-x)}I_x = \text{Mole Fraction } I_x$$

The weight fraction of each component in the final product, $SB_{(4-x)}I_x$, can be determined from the mole fraction as follows:

$$\text{Wt. Fraction of } (SB)_{(4-x)}I_x = \frac{\text{Mass of } (SB)_{(4-X)}I_x}{\text{Total Mass}} \quad (5)$$

where:

$$\text{Mass of } (SB)_{(4-x)}I_x = \text{Mole Fraction of } (SB)_{(4-x)}I_x \cdot \quad (6)$$

$$[MW \text{ of } (SB)_{(4-x)}I_x] = \text{Mole Fraction of } I_x \cdot [MW \text{ of } (SB)_{(4-x)}I_x]$$

$$MW \text{ of } (SB)_{(4-x)}I_x = MW\ SB \cdot (4-x) + MW\ I \cdot x \quad (7)$$

Substituting equation (7) into equation (6) and this into equation (5) gives:

$$\text{Wt. Fraction of } (SB)_{(4-x)}I_x = \quad (8)$$

$$\frac{\text{Mole Fraction of } I_x \cdot [MW\ SB \cdot (4-x) + MW\ I \cdot x]}{\text{Total Mass}}$$

The total mass is equal to the sum over all components of the final product:

$$\text{Total Mass} = \quad (9)$$

$$\sum_{x=1,2,3} \text{Mole Fraction of } I_x \cdot [MW\ SB \cdot (4-x) + MW\ I \cdot x]$$

Substituting equation (4) into equation (9) gives:

$$\text{Total Mass} = \quad (10)$$

$$\sum_{x=1,2,3} \left( \left[ \frac{\left(\dfrac{\text{Wt. Fraction of } I_x}{MW\ I \cdot x}\right)}{\left(\sum\limits_{x=1,2,3} \dfrac{\text{Wt. Fraction of } I_x}{MW\ I \cdot x}\right)} \right] \cdot [MW\ SB \cdot (4-x) + MW\ I \cdot x] \right)$$

Finally, substituting equations (4) and (10) into equation (8) gives the expression for the weight fraction of each component in the final product:

$$\text{Wt. Fraction of } (SB)_{(4-x)}I_x = \frac{\left[ \dfrac{\left(\dfrac{\text{Wt. Fraction of } I_x}{MW\ I \cdot x}\right)}{\left(\sum\limits_{x=1,2,3} \dfrac{\text{Wt. Fraction of } I_x}{MW\ I \cdot x}\right)} \right] \cdot [MW\ SB \cdot (4-x) + MW\ I \cdot x]}{\sum\limits_{x=1,2,3} \left( \left[ \dfrac{\left(\dfrac{\text{Wt. Fraction of } I_x}{MW\ I \cdot x}\right)}{\left(\sum\limits_{x=1,2,3} \dfrac{\text{Wt. Fraction of } I_x}{MW\ I \cdot x}\right)} \right] \cdot [MW\ SB \cdot (4-x) + MW\ I \cdot x] \right)} \quad (11)$$

EXAMPLE 1

Polymer 1 (PP5293)

An asymmetric radial polymer was prepared by polymerizing in a first reactor 24.8 lb of styrene in 242 lb of cyclohexane solvent and 21.5 lbs of diethylether with 1050 mls of sec-butyllithium anionic polymerization initiator at 60° C. for 10 half-lives. Following polymerization of the styrene, 62.6 lb of butadiene was added and the butadiene polymerized at 55° C. for at least 10 half-lives. In a separate reactor, 38.7 lb of isoprene in 226.45 lb of cyclohexane was polymerized using 710 mls of sec-butyllithium at 60° C. for at least 8 half-lives. Following polymerization of the isoprene, 2 lb of butadiene was added and the butadiene polymerized at 60° C. for at least 8 half-lives. To this polyisoprene was added 66 mls of tetramethoxysilane coupling agent and the mixture was reacted for 45 min at 60° C. To this partially coupled intermediate was added 285 lb of the solution of polystyrene-polybutadiene diblock copolymer in cyclohexane from the first reactor and 180 mls of 1,2-dimethoxyethane. This mixture was reacted for 60 min at 75° C. to achieve coupling of the remaining sites of the partially coupled intermediate. Any remaining living polymer arms were terminated by the addition of approximately 90 mls of methanol.

The polymer was then hydrogenated under conditions which preferentially hydrogenated the polybutadiene portion of the polymer leaving the polyisoprene portion substantially unsaturated. The resulting polymer was isolated by contacting the polymer solution with high pressure steam followed by removal of the solid polymer from the liquid phase. The product polymer was determined to have a polystyrene molecular weight of 9,900 g/mole and a polybutadiene molecular weight of 23,700 in the diblock copolymer arms and a molecular weight of 20,300 g/mole of the homopolyisoprene arms (containing a small terminal polybutadiene block of less than 5% by weight) by gel permeation chromatography (GPC). The polystyrene content as determined by $^1$H NMR is 17.4% w. After selective hydrogenation, the polymer had a combined 60% hydrogenated rubber with 92% of the polybutadiene and 49% of the polyisoprene hydrogenated.

Polymers 2–6

Five asymmetric radial polymers were prepared in the same manner as Polymer 1 except for changes in the amount of solvent, reagents, and coupling conditions used. Table 1 describes the polymerization and analysis of these polymers.

cyclohexane solvent and 21.3 lbs of diethylether with 1000 mls of sec-butyllithium artionic polymerization initiator at 45° C. for at least 10 half-lives. Following polymerization of the styrene, 54 lb of butadiene was added and the butadiene polymerized at 70° C. for at least 10 half-lives. In a separate reactor, 30.3 lb of isoprene in 122.09 lb of cyclohexane was polymerized using 522 mls of sec-butyllithium at 55° C. for at least 8 half-lives. To this polyisoprene was added 43 mls of silicon tetrachloride coupling agent and the mixture was reacted for 60 min at 25° C. To this partially coupled intermediate was added 219.15 lb of the solution of polystyrene-polybutadiene diblock copolymer in cyclohexane from the first reactor and 66 mls of 1,2-dimethoxyethane. This mixture was reacted for 60 min at 70° C. to achieve coupling of the remaining sites of the partially coupled intermediate. The polymer was then hydrogenated under conditions which preferentially hydrogenated the polybutadiene portion of the polymer leaving the polyisoprene portion substantially unsaturated. The resulting polymer was isolated by contacting the polymer solution with high pressure steam followed by removal of the solid polymer from the liquid phase. The product polymer was determined to have a polystyrene molecular weight of 5500 g/mole and a polybutadiene molecular weight of 19400 in the diblock copolymer arms and a molecular weight of 18400 g/mole of the homopolyisoprene arms by gel permeation chromatography (GPC). The polystyrene content as determined by $^1$H NMR is 13.6% w. After selective hydrogenation, the polymer had a combined 50.5% hydrogenated rubber with 90.1%

TABLE 1

|  | Polymer 2 (PP5336) | Polymer 3 (PP5291) | Polymer 4 (PP5299) | Polymer 5 (PP5397) | Polymer 6 (PP5402) |
| --- | --- | --- | --- | --- | --- |
| First reactor |  |  |  |  |  |
| lbs of cyclohexane | 241.9 | 241.63 | 241.62 | 245.3 | 241.58 |
| lbs of diethylether | 21.2 | 21.4 | 21.2 | 21.4 | 21.2 |
| lbs of styrene | 24.8 | 24.9 | 24.8 | 24.8 | 25 |
| mls of sec-butyllithium | 1025 | 1040 | 1010 | 1025 | 1000 |
| lbs of butadiene | 62.6 | 62.4 | 62.4 | 62.6 | 62.6 |
| Second reactor |  |  |  |  |  |
| lbs of cyclohexane | 226.5 | 226.4 | 226.5 | 226.55 | 227.92 |
| lbs of isoprene | 38.8 | 38.7 | 38.7 | 38.6 | 38.6 |
| lbs of butadiene | 2 | 2 | 2 | 2 | 2 |
| mls of sec-butyllithium | 800 | 833 | 811 | 800 | 800 |
| First coupling step |  |  |  |  |  |
| mls of tetramethoxysilane | 66 | 66 | 66 | 66 | 66 |
| coupling temperature (°C.) | 60 | 62 | 60 | 60 | 60 |
| coupling time (min) | 30 | 45 | 30 | 30 | 30 |
| Second coupling step |  |  |  |  |  |
| lbs of S-B cement transferred | 285.4 | 285.05 | 285.21 | 282.25 | 285.12 |
| mls of activator | 180 | 180 | 180 | 180 | 180 |
| coupling temperature (°C.) | 80 | 80 | 80 | 80 | 80 |
| coupling time (min) | 60 | 60 | 60 | 60 | 60 |
| mls of Methanol | 8 | 42 | 8 | 0 | 8 |
| Polymer characteristics[b] |  |  |  |  |  |
| Styrene block MW | 9150 | 9000 | 9900 | 8990 | 9140 |
| Butadiene of S-B arm MW | 22550 | 21600 | 23500 | 22070 | 22860 |
| Isoprene of I arm MW | 17600 | 17200 | 17800 | 17570 | 17300 |
| Polystyrene content (% w) | 17.5 | 18.0 | 17.9 | 18.7 | 17.7 |
| Total % hydrogenated rubber | 61.4 | 52.5 | 60 | 57.4 | 60.3 |
| % Polybutadiene hydrogenated | 93.5 | 89 | 93 | 91 | 93 |
| % Polyisoprene hydrogenated | 50.8 | 30 | 46 | 41 | 48 |

Polymer 7:4773

An asymmetric radial polymer was prepared by polymerizing in a first reactor 16.2 lb of styrene in 259.4 lb of of the polybutadiene and 23.3% of the polyisoprene hydrogenated.

Polymers 8–11

Four asymmetric radial polymers were prepared in the same manner as Example 7 except for changes in the amount of solvent, reagents, and coupling conditions used. Table 2 describes the polymerization and analysis of these polymers.

coupled intermediate was added 296.76 lb of the solution of polystyrene-polyisoprene diblock copolymer in cyclohexane from the first reactor and 32 mls of 1,2-dimethoxyethane. This mixture was reacted for 60 min at 70° C. to achieve coupling of the remaining sites of the partially

TABLE 2

|  | Polymer 8 (PP4786) | Polymer 9 (PP4918) | Polymer 10 (PP5066) | Polymer 11 (PP5090) |
| --- | --- | --- | --- | --- |
| First reactor |  |  |  |  |
| lbs of cyclohexane | 259.17 | 259.1 | 259.1 | 242.6 |
| lbs of diethylether | 21.3 | 21.5 | 21.5 | 21.4 |
| lbs of styrene | 16.1 | 20.8 | 21 | 25.8 |
| mls of sec-butyllithium | 1035 | 780 | 780 | 1050 |
| lbs of isoprene | 54 | 49.4 | 49.4 | 61.6 |
| Second reactor |  |  |  |  |
| lbs of cyclohexane | 121.06 | 109.3 | 109.2 | 283.78 |
| lbs of isoprene | 30.3 | 27.3 | 27.5 | 42.8 |
| mls of sec-butyllithium | 530 | 525 | 525 | 835 |
| First coupling step |  |  |  |  |
| mls of silicon tetrachloride | 35 | 35 | 30.5 | 52 |
| Coupling temperature (°C.) | 60 | 60 | 60 | 60 |
| Coupling time | 60 | 60 | 60 | 60 |
| Second coupling step |  |  |  |  |
| lbs of S-B cement transferred | 218.56 | 213.68 | 213.64 | 241.75 |
| mls of activator | 70 | 40 | 40 | 90 |
| Coupling temperature (°C.) | 70 | 60 | 60 | 60 |
| Coupling time | 60 | 60 | 60 | 60 |
| Polymer characteristics[b] |  |  |  |  |
| Styrene block MW | 5800 | 10400 | 9700 | 9900 |
| Butadiene of S-B arm MW | 21500 | 24000 | 22900 | 23500 |
| Isoprene of I arm MW | 19600 | 18000 | 20500 | 17800 |
| Polystyrene content (% w) | 13.4 | 17.9 | 18.1 | 17.3 |
| Total % hydrogenated rubber | 51.6 | 43.4 | 63.7 | 44.1 |
| % Polybutadiene hydrogenated | 93.8 | 86.4 | 96.4 | 91.6 |
| % Polyisoprene hydrogenated | 22.0 | 17.2 | 57.8 | 15.2 |

Polymer 12: (PP4813)

An asymmetric radial polymer was prepared by polymerizing in a first reactor 15.6 lb of styrene in 280.12 lb of cyclohexane solvent with 840 mls of sec-butyllithium antionic polymerization initiator at 60° C. for 10 half-lives. Following polymerization of the styrene, 54.6 lb of isoprene was added and the isoprene polymerized at 550° C. for 12 half-lives. In a separate reactor, 10.7 lb of isoprene in 42.76 lb of cyclohexane was polymerized using 435 mls of sec-butyllithium at 60° C. for 12 half-lives. To this polyisoprene was added 34 mls of silicon tetrachloride coupling agent and the mixture was reacted for 60 min at 25° C. To this partially coupled intermediate. The polymer was then hydrogenated. The resulting polymer was isolated by contacting the polymer solution with high pressure steam followed by removal of the solid polymer from the liquid phase. The product polymer was determined to have a polystyrene molecular weight of 6300 g/mole and a polyisoprene molecular weight of 22600 in the diblock copolymer arms and a molecular weight of 9200 g/mole of the homopolyisoprene arms by gel permeation chromatography (GPC). The polystyrene content as determined by $^1$H NMR is 18.4% w. After selective hydrogenation, the polymer had 99% of the polyisoprene hydrogenated.

TABLE 3

| | Tetramethoxysilane Coupled Polymers | | | | | |
| --- | --- | --- | --- | --- | --- | --- |
|  | Polymer 1 5226 | Polymer 2 5336 | Polymer 3 5291 | Polymer 4 5299 | Polymer 5 5397 | Polymer 6 5402 |
| Polymer Type | (SEB)$_2$I$_2$ | (SEB)$_2$I$_2$ | (SEB)$_2$I$_2$ | (SEB)$_2$I$_2$ | (SEB)$_2$I$_2$ | (SEB)$_2$I$_2$ |
| Polymer MW (10$^3$ g/mole) | (9.9–23.7)$_2$(20.3)$_2$ | (9.15–22.55)$_2$(17.6)$_2$ | (9.0–21.6)$_2$(17.2)$_2$ | (9.9–23.5)$_2$(17.8)$_2$ | (9.0–22.1)$_2$(17.6)$_2$ | (9.1–22.9)$_2$(17.3)$_2$ |
| | Intermediate Distribution, from GPC | | | | | |
| I:Si | 1.95 | 2.2 | 2.35 | 2.3 | 2.2 | 2.3 |
| I$_1$Si(OMe)$_3$ | 8.1 | 6.8 | 4.9 | 6.7 | 4.9 | 7.6 |
| I$_2$Si(OMe)$_2$ | 83.5 | 63.1 | 74.8 | 78.9 | 66.9 | 64.9 |
| I$_3$Si(OMe) | 8.3 | 30.0 | 20.2 | 14.3 | 28.2 | 27.5 |

TABLE 3-continued

| | Tetramethoxysilane Coupled Polymers | | | | | |
|---|---|---|---|---|---|---|
| | Polymer 1 5226 | Polymer 2 5336 | Polymer 3 5291 | Polymer 4 5299 | Polymer 5 5397 | Polymer 6 5402 |
| | Final Product Distribution, calculated | | | | | |
| $(SEB)_3I$ | 17.4 | 16.2 | 11.5 | 15.2 | 11.8 | 19.9 |
| $(SEB)_2I_2$ | 78.2 | 65.9 | 76.7 | 77.0 | 71 | 66.5 |
| $(SEB)I_3$ | 4.4 | 17.9 | 11.9 | 7.8 | 17.2 | 13.6 |

TABLE 4

| | Silicon Tetrachloride Coupled Polymers | | | | | |
|---|---|---|---|---|---|---|
| | Polymer 7 PP4773 | Polymer 8 PP4786 | Polymer 12 PP4813 | Polymer 9 PP4918 | Polymer 10 PP5066 | Polymer 11 PP5090 |
| Polymer Type | $(SEB)_2I_2$ | $(SEB)_2I_2$ | $(SEP)_2(EP)_2$ | $(SEB)_2I_2$ | $(SEB)_2I_2$ | $(SEB)_2I_2$ |
| Polymer MW ($10^3$ g/mole) | $(5.5–19.4)_2(18.4)_2$ | $(5.8–21.5)_2(19.6)_2$ | $(6.3–22.6)_2(9.2)_2$ | $(10.4–24)_2(18)_2$ | $(9.7–22.9)_2(20.5)_2$ | $(9.9–23.5)_2(17.8)_2$ |
| | Intermediate Distribution, from GPC | | | | | |
| I:Si | 2 | 2.3 | 1.8 | 2.3 | 2.3 | 2.4 |
| $I_1SiCl_3$ | 50.2 | 41.38 | 38.4 | 26.9 | 11 | 20.9 |
| $I_2SiCl_2$ | 38.4 | 25 | 52.9 | 42.1 | 47 | 50.9 |
| $I_3SiCl$ | 11.4 | 33.67 | 8.7 | 31 | 42 | 28.2 |
| | Final Product Distribution, calculated | | | | | |
| $(SEB)_3I$ | 70.4 | 66.3 | 62.8 | 50.9 | 25.4 | 40.7 |
| $(SEB)_2I_2$ | 25.0 | 18.5 | 34.4 | 34.6 | 48.8 | 44.7 |
| $(SEB)I_3$ | 4.6 | 15.2 | 3.0 | 14.5 | 25.8 | 14.7 |

*For Polymer 12, the final product components are $(SEP)_3(EP)$, $(SEP)_2(EP)_2$, $(SEP)(EP)_3$ The data presented in Tables 3 and 4 show that the tetramethoxysilane coupling agent consistantly produces much higher percentages of the desired intermediate—$I_2$—and final product—$(SEB)_2I_2$—components than silicon tetrachloride. For tetramethoxysilane-coupled polymers, $I_2$ ranges from 63 to 83.5% weight of the total mass of the partially coupled intermediate which yields 66.5 to 78% w (of all four arm ARP's polymers produced) of the desired $(SEB)_2I_2$ final product component. For, silicon tetrachloride-coupled polymers $I_2$ is only 25 to 5 1% w of the partially coupled intermediate distribution. This yields 18.5 to 49% w of the desired $(SEB)_2I_2$ (or $(SEB)_2(EP)_2$) in the final product composition. In four out of six silicon tetrachloride-coupled polymers, the desired four arm ARP's polymer with a 2:2 arm ratio does not compose the largest weight fraction of the three final product components.

TABLE 5

| | Polymer 9 PP4918 | Polymer 3 PP5291 |
|---|---|---|
| Polymer Type | $(SEB)_2I_2$ | $(SEB)_2I_2$ |
| Polymer MW ($10^3$ g/mole)[a] | $(10.4–24)_2(18)_2$ | $(9.0–21.6)_2(17.2)_2$ |
| Coupling Agent | $SiCl_4$ | $Si(OMe)_4$ |
| % w$(SEB)_3I$[b] | 50.9 | 11.5 |
| % w$(SEB)_2I_2$[b] | 34.6 | 76.7 |
| % w$(SEB)I_3$[b] | 14.5 | 11.9 |
| Total % Hydrogenated Rubber[c] | 43.6 | 52.5 |
| % Polybutadiene Hydrogenated[c] | 86.4 | 89 |
| % Polyisoprene Hydrogenated[c] | 17.4 | 30.4 |
| Ultimate Tensile Strength (psi)[d] | 399 ± 17 | 559 ± 19 |
| Toluene Solution Viscosity, 20% Solids, 25° C.[e] | 166 ± 1 | 161 ± 1 |
| Melt Flow, 230° C., 5 kg | 31 | 37.2 |

[a]Determined by Gel Permeation Chromatography.
[b]% of Total four-arm asymmetric radial polymer as calculated from the partially coupled intermediate distribution (as determined by Gel Permeation Chromatography) using Equation 11 in the text.
[c]Determined by $^1$H NMR spectroscopy.
[d]Measured on an Instron Model 4505 using specimens cut from toluene cast plaques. Gauge length = 1 in; extension rate = 100%/min.
[e]Measured on a Brookfield Model DV-II, spindle 21.

The data in Table 5 compare the physical properties of a silicon tetrachloride-coupled asymmetric radial polymer to a tetramethoxysilane-coupled asymmetric radial polymer of similar polymer arm molecular weight and composition. The silicon tetrachloride-coupled polymer which contains 50% $(SEB)_3I$ of the total four-arm asymmetric radial polymer has a lower polymer melt flow indicating a higher melt viscosity. The observed higher strength of the tetramethoxysilane-coupled polymer may be due to both the improved final product distribution and the higher level of polydiene hydrogenation. These data show that the improved final product distribution of tetramethoxysilane-coupled polymers results in a higher performance product with more desirable properties.

TABLE 6

|  | Polymer 10 PP5066 | Polymer 4 PP5299 |
|---|---|---|
| Polymer Type | (SEB)$_2$I$_2$ | (SEB)$_2$I$_2$ |
| Polymer MW (10$^3$ g/mole)[a] | (9.7–22.9)$_2$(20.5)$_2$ | (9.9–23.5)$_2$(17.8)$_2$ |
| Coupling Agent | SiCl$_4$ | Si(OMe)$_4$ |
| % w(SEB)$_3$I[b] | 25.4 | 15.2 |
| % w(SEB)$_2$I$_2$[b] | 48.8 | 77.0 |
| % w(SEB)I$_3$[b] | 25.8 | 7.8 |
| Total % Hydrogenated Rubber[c] | 63.7 | 59.6 |
| % Polybutadiene Hydrogenated[c] | 96.4 | 92.8 |
| % Polyisoprene Hydrogenated[c] | 57.8 | 45.7 |
| Ultimate Tensile Strength (psi)[d] | 508 ± 40 | 694 ± 35 |
| Toluene Solution Viscosity, 20% Solids, 25° C.[e] | 257 ± 1 | 292 ± 1 |
| Melt Flow, 230° C., 5 kg | 14 | 10 |

[a]Determined by Gel Permeation Chromatography.
[b]% of Total four-arm asymmetric radial polymer as calculated from the partially coupled intermediate distribution (as determined by Gel Permeation Chromatography) using Equation 11 in the text.
[c]Determined by $^1$H NMR spectroscopy.
[d]Measured on an Instron Model 4505 using specimens cut from toluene cast plaques. Gauge length = 1 in; extension rate = 100%/min.
[e]Measured on a Brookfield Model DV-II, spindle 21.

The data in Table 6 compare the physical properties of a silicon tetrachloride-coupled asymmetric radial polymer to a tetramethoxysilane-coupled asymmetric radial polymer of similar polymer arm molecular weight and composition. The presence of a large amount of the nonmatrix forming (SEB)I$_3$ in the final product of the silicon tetrachloride-coupled polymer balances with the presence of high viscosity (SEB)$_3$I to produce an asymmetric radial polymer with similar melt and solution viscosity to the tetramethoxysilane-coupled polymer. However, the presence of this (SEB)I$_3$ results in a much weaker polymer with significantly lower tensile strength than the tetramethoxysilane-coupled polymer despite a higher level of polydiene hydrogenation. These data show that the improved final product distribution of tetramethoxysilane-coupled polymers results in a higher performance product with more desirable properties. If the above polymers are to be used in an application where they will be blended with other ingredients, less of the tetramethoxysilane-coupled asymmetric radial polymer will be needed to achieve equivalent performance of the final product.

EXAMPLE 2

Six different coupling agents were investigated for their ability to produce four-arm polymer in the presence of an excess of living polybutadiene arms. In the experiments described in Table 7, greater than four equivalents of living polybutadiene arms were contacted with the coupling agents in the presence of 200 ppm ethylene glycol diethyl ether at 80° C. for 60 minutes with stirring. In each case unreacted polymer arm is also present as expected, due to the excess added. These data show that silicon tetrachloride, tetramethoxysilane, and γ-glycidoxypropyltrimethoxysilane are effective in producing high percentages of four-arm polymer with little three-arm polymer remaining. The other three coupling agents used in these experiments, 2-(3,4-epoxycyclohexyl)ethyltrimethoxysilane, dimethyl adipate, and tetrakis(2-ethylbutoxy)silane produced inadequate amounts of four-arm polymer.

TABLE 7

| Experiment No. | Coupling Agent | Molecular Weight of Polybutadiene (g/mole)[a] | Molar Ratio Polybutadiene:Coupling Agent[b] | % w(BD)$_4$[c] | % w(BD)$_3$[c] |
|---|---|---|---|---|---|
| 1 | Silicon tetrachloride | 4800 | 5.2:1 | 92.7 | 7.3 |
| 2 | Tetramethoxysilane | 5150 | 4.9:1 | 94.6 | 5.4 |
| 3 | γ-glycidoxypropyltrimethoxysilane | 4900 | 5.1:1 | 90.3 | 9.7 |
| 4 | 2-(3,4-epoxycyclohexyl)ethyltrimethoxysilane | 4700 | 5.3:1 | 82.7 | 17.3 |
| 5 | dimethyl adipate | 4700 | 5.3:1 | 74.3 | 25.7 |
| 6 | tetrakis(2-ethylbutoxy) silane | 4800 | 5.2:1 | 30.7 | 69.3 |

[a]Determined by Gel Permeation Chromatography.
[b]Calculated from the observed number of moles of polybutadiene (determined from the polybutadiene molecular weight) and the moles of coupling agent added to the reaction.
[c]Determined by nonlinear curve fitting of Gel Permeation Chromatograms.

The coupling agents that provide high coupling efficiency to four-arm polymer were subsequently investigated for their selectivity in the first coupling step of the synthesis of asymmetric radial polymers. In the experiments described in Table 8, two equivalents of living polyisoprene arms were contacted with the coupling agents at 60° C. for 30 minutes with stirring. These data show that tetramethoxysilane and γ-glycidoxypropyltrimethoxysilane produce higher amounts of the desired two-arm partially coupled intermediate than silicon tetrachloride. Tetramethoxysilane is the most effective coupling agent in maximizing the amount of two-arm polymer. This will yield a final product that maximizes the amount of polymer with the desired structure.

TABLE 8

| Experiment No. | Coupling Agent | Polyisoprene Molecular Weight (g/mole)[a] | Molar Ratio Polyisoprene:Coupling Agent[b] | % w(I)$_1$[c] | % w(I)$_2$[c] | % w(I)$_3$[c] |
|---|---|---|---|---|---|---|
| 7 | Tetramethoxysilane | 8500 | 1.8:1 | 11.7 | 86.2 | 2.1 |
| 8 | γ-glycidoxypropyltrimethoxysilane | 8400 | 1.8:1 | 27.9 | 57.5 | 13.6 |
| 9 | Silicon tetrachloride | 7300 | 2.1:1 | 19.9 | 41.2 | 38.9 |

[a]Determined by Gel Permeation Chromatography.
[b]Calculated from the observed number of moles of polybutadiene (determined from the polybutadiene molecular weight) and the moles of coupling agent added to the reaction.
[c]Determined by nonlinear curve fitting of Gel Permeation Chromatograms.

We claim:

1. A process for producing a predominately four-armed asymmetric radial block copolymer which contains predominately two arms which are copolymers of at least one conjugated diene and a vinyl aromatic hydrocarbon and two conjugated diene homopolymer or copolymer arms, said process comprising:
   (a) anionically polymerizing at least one conjugated diene monomer and at least one vinylaromatic hydrocarbon monomer to form a set of living polymer arms,
   (b) anionically polymerizing at least one conjugated diene monomer to form another set of living polymer arms,
   (c) coupling one set of living polymer arms with a coupling agent which is selected from the group consisting of tetramethoxysilane and γ-glycidoxypropyltrimethoxysilane,
   (d) substantially completing the coupling reaction while leaving, on average, two unreacted coupling sites on the coupling agent,
   (e) adding the other set of living polymer arms to the product of d) and coupling the other set of living polymer arms to the first coupled set of polymer arms, and
   (f) optionally hydrogenating the coupled polymer, either partially or fully.

2. The method of claim 1 wherein the coupling agent is tetramethoxysilane.

3. The method of claim 1 wherein one set of polymer arms is polyisoprene and the other set of polymer arms is a block copolymer of isoprene and styrene.

4. The method of claim 1 wherein one set of polymer arms is comprised of a block copolymer of styrene and isoprene and\or butadiene and the other set of polymer arms is comprised of isoprene and/or butadiene.

5. The method of claim 4 wherein the block polymer is hydrogenated to provide a polymer of which one set of polymer arms is comprised of a block copolymer of styrene and hydrogenated isoprene and/or hydrogenated butadiene and the other set of polymer arms is comprised of hydrogenated isoprene and/or hydrogenated butadiene.

6. The method of claim 4 wherein one set of polymer arms is comprised of a block copolymer of styrene and butadiene and the other set of polymer arms is polyisoprene.

7. The method of claim 6 wherein the block copolymer is partially hydrogenated to provide a polymer of which one set of polymer arms is comprised of a block copolymer of styrene and hydrogenated butadiene and the other set of polymer arms is partially hydrogenated polyisoprene.

8. The product of the process of claim 1.
9. The product of the process of claim 2.
10. The product of the process of claim 3.
11. The product of the process of claim 4.
12. The product of the process of claim 5.
13. The product of the process of claim 6.
14. The product of the process of claim 7.

* * * * *